United States Patent [19]

Lorts

[11] Patent Number: 4,532,899
[45] Date of Patent: Aug. 6, 1985

[54] INTERNAL COMBUSTION ENGINE FUEL-INJECTION SYSTEM

[76] Inventor: Anthony Lorts, 441 S. Brooke, Apartment C, Alpena, Mich. 49707

[21] Appl. No.: 506,983

[22] Filed: Jun. 23, 1983

[51] Int. Cl.³ .............................................. F02B 19/02
[52] U.S. Cl. ..................................... 123/292; 123/255; 123/256; 123/261; 123/264
[58] Field of Search ............... 123/292, 255, 256, 261, 123/264

[56] References Cited

U.S. PATENT DOCUMENTS

| | | | |
|---|---|---|---|
| 974,853 | 11/1910 | Bock | 123/292 |
| 3,911,878 | 10/1975 | Hofbauer et al. | 123/292 |
| 3,982,506 | 9/1976 | Holtrop | 123/264 |

FOREIGN PATENT DOCUMENTS

| | | | |
|---|---|---|---|
| 357110 | 8/1922 | Fed. Rep. of Germany | 123/292 |
| 2278920 | 2/1976 | France | 123/292 |
| 436824 | 10/1935 | United Kingdom | 123/292 |

*Primary Examiner*—Andrew M. Dolinar
*Attorney, Agent, or Firm*—Hauke and Patalidis

[57] ABSTRACT

A fuel injection and precombustion chamber arrangement for internal combustion engines comprising a pair of concentric poppet valves. The outermost valve is arranged to open and close the precombustion chamber to the internal combustion engine cylinder. The innermost valve is arranged to open and close a chamber, formed in the outermost valve body, to the cylinder and to place a fuel-filled annular groove on the spool of the innermost valve in communication with the precombustion chamber and the chamber in the outermost valve such as to mix air flowing through the chamber of the outermost valve from the cylinder fuel and inject into the precombustion chamber the fuel contained in the annular groove in an atomized state.

8 Claims, 7 Drawing Figures

INTERNAL COMBUSTION ENGINE FUEL-INJECTION SYSTEM

BACKGROUND OF THE INVENTION

This invention relates to internal combustion engines of either the two or four stroke cycle, and is particularly directed at providing an improved method of fuel injection.

The decline of the world's petroleum reserves has caused engine designers to seek more efficient variations of the internal combustion engine, such as those employing the highest possible compression ratios, lean mixtures and electronic regulation of engine functions. The diesel engine being the logical extension of these variations has seen increasing popularity. However, several obstacles have prevented the diesel engine from gaining widespread acceptance in the automotive field, these being primarily excessive weight required to counter the destructive effects of detonation, high noise and soot emission levels, increased cost and complexity resulting from the use of high pressure fuel injection systems, and a reduced operating speed range as compared with the conventional gasoline engines. All of these obstacles are attributable to the method of fuel injection presently employed which, by having to overcome the immense pressure developed in the engine cylinders, fails to evenly distribute a homogeneous mixture of fuel and air throughout the combustion chamber.

The disadvantages associated with the prior fuel injected engines are eliminated by the present invention and an improved engine is provided having the benefits of both direct injection and precombustion chamber designs, while eliminating the costly and complex pumps and injectors associated with both.

SUMMARY OF THE INVENTION

The present invention is addressed to a compound poppet valve assembly for an internal combustion engine which acts to isolate a precombustion chamber from the cylinder of an internal combustion engine during a portion of the engine compression stroke, and also acts as a fuel injection means. During the latter part of the compression stroke, hot compressed air from the cylinder travels through passages within a compound poppet valve assembly where it mixes with a previously deposited fuel charge before entering the precombustion chamber. Hot, compressed air from the cylinder is thus utilized to vaporize and propel a fuel charge into the combustion chamber prior to ignition, which may then occur spontaneously or with the aid of a spark plug, thereby promoting improved homogeneity of the fuel-air mixture, which results in an engine with greater efficiency, reduced emissions and a more extended operating range.

The method of operation will be apparent from the following description, read in conjunction with the accompanying drawings wherein:

DETAILED DESCRIPTION OF THE PREFERRED EMBODIMENTS

Figure 1:
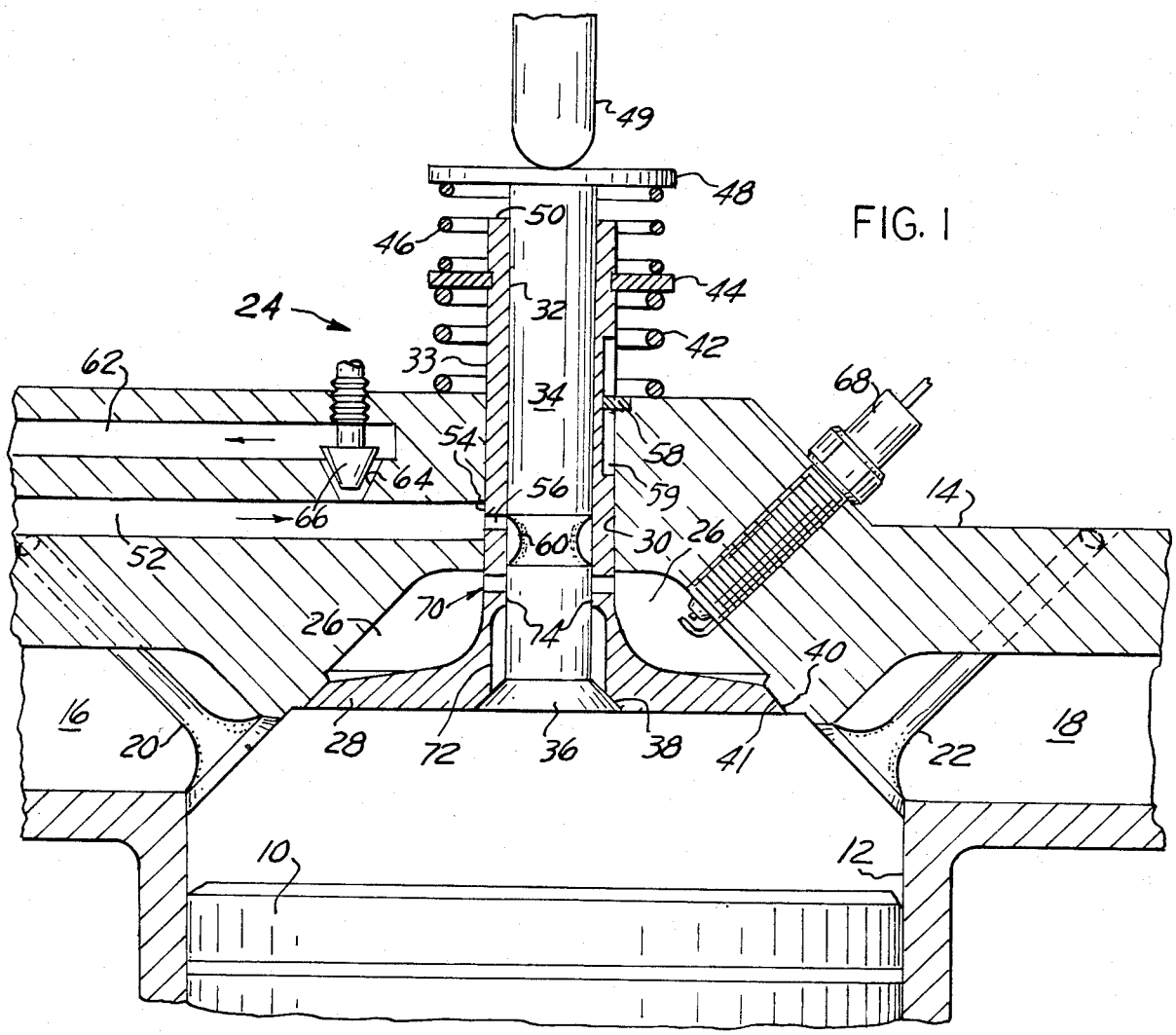
FIG. 1 schematically represents an example of fuel injection and precombustion chamber structure for an internal combustion engine, according to the present invention.

Referring to FIG. 1, the top portion of a cylinder of a four-stroke cycle reciprocating engine, shown for the purpose of illustration, is provided with a piston 10 reciprocable within a cylinder 12 closed by a cylinderhead 14. The cylinderhead 14 is formed with an intake port 16 and an exhaust port 18 which are in communication with the cylinder 12 and serve, respectively, to allow air to be introduced into the cylinder 12 during the intake stroke of the piston 10 and exhaust gases to be exhausted from the cylinder 12 during the exhaust stroke. The poppet valves 20 and 22 operate in the conventional manner to control the introduction of air into and the exhaust of the spent gases from the cylinder 12. The piston 10 is connected in a conventional manner to a crankshaft, not shown.

Centrally located in the cylinderhead 14, there is a compound valve assembly 24 that acts to seal a precombustion chamber 26 from the cylinder 12 during a portion of the compression stroke, and also acts to inject a fuel and air mixture into the precombustion chamber 26 during the latter portion of the compression stroke. The compound valve assembly 24 consists of a poppet valve 28 reciprocable within a bore 30 in the cylinderhead 14. The poppet valve 28 has a bore 32, formed within its stem 33, that extends throughout its entire length. Reciprocating within the bore 32 of the poppet valve 28 is a spool valve 34 which terminates at its lower end in the form of a poppet valve head having a face 36 which is seatable in a valve seat 38 formed within the center of the head of the poppet valve 28. The head of the poppet valve 28 has a face 40 which is held against a seat 41 on the edge of the precombustion chamber 26 by the force of a coil spring 42 held in compression between the top of the cylinderhead 14 and the bottom of a spring retainer 44 attached to the stem 33. The face 36 of the spool valve 34 is held seated against the seat 38 within the poppet valve 28 by the force of a compressed coil spring 46 located immediately above the spring retainer 44. The spring 46 is compressed between the top of the spring retainer 44 and the bottom of a spring retainer 48 attached to the top of the stem of the spool valve 34. The lower spring 42 is much less compliant than the upper spring 46, so that when a downward force is applied to the spring retainer 48 by an appropriate actuating means such as by a rocker arm, a cam or a solenoid, generally shown at 49, the spool valve 34 reciprocates downwardly while the poppet valve 28 remains upon its seat until the lower edge of the spring retainer 48 contacts the top 50 of the stem 33 of the poppet valve 28.

The cylinderhead 14 is formed with a passageway or fuel supply line 52 which is in communication with the bore 30 via a port 54. The fuel supply line 52 delivers fuel to a port 56 disposed through the wall of the stem 33 of the poppet valve 28, immediately adjacent to the port 54 when the poppet valve 28 is in its uppermost seated position. The poppet valve 28 is provided with a key 58 and longitudinal groove 59 arrangement to prevent it from rotating relative to the cylinderhead 14 and thereby causing the ports 54 and 56 to become misaligned.

The pool valve 34 is formed with an annular groove 60 positioned around the circumference of its stem immediately adjacent to the port 56 of the poppet valve 28 when the spool valve 34 is reciprocated to its uppermost seated position within the poppet valve 28. The annular groove 60 acts as a reservoir for fuel introduced through the port 56 from the fuel supply line 52 when both valves 28 and 34 are seated at their uppermost positions, and the annular groove 60 of the spool valve 34 is in communication with the fuel supply line 52. Fuel is supplied to the fuel supply line 52 by a suitable pump, not shown, which maintains a constant rate of fuel delivery under varying pressures.

The fuel supply line 52 is in communication with a passageway forming a fuel return line 62 in the cylinder-head 14 which carries excess unused fuel back to a suitable supply tank. Located between the fuel supply line 52 and the fuel return line 62 is a fuel bleed port 64 in which adjustably reciprocates a needle valve 66. The position of the needle valve 66 within the fuel bleed port 64, as set by a suitable control means, not shown, determines how much fuel is allowed to pass into the fuel return line 62, which in turn determines the fuel pressure in the fuel supply line 52. The variation of the fuel pressure in the fuel supply line 52 controls the rate at which fuel passes through the port 56 through the stem 33 of the poppet valve 28 into the annular groove 60 of the spool valve 34. Fuel that is received in the annular groove 60 will be injected into the precombustion chamber 26 during the latter part of the compression stroke in the manner detailed herein. The amount of fuel injected into the precombustion chamber 26 during the latter part of each compression stroke of the piston 10 determines the power output per cycle, as is common to diesel engines. A spark plug 68 is provided as an auxiliary means of controlling the ignition of the combustible mixture within the precombustion chamber 26.

The tubular wall of the stem 33 of the poppet valve 28 is provided with a circular row of radially disposed bores or ports 70, placing the bore 32 within the stem 33 in communication with the precombustion chamber 26. The bores defining the ports 70 may be aligned along consecutive radii, or, preferably, in order to impose a swirling motion to the fuel-air mixture introduced into the precombustion chamber 26, as explained hereinafter they may be disposed at an angle to radii of the bore 32 in the valve stem 33. The bottom end of the bore 32 is enlarged such as to form a generally annular auxiliary chamber 72 which, in the seated position of the spool valve 34 with its face 36 seated in the seat 38, is fully closed to the cylinder 12. The annular auxiliary chamber 72, in the position illustrated in FIG. 1, is also separated from the circular row of ports 70 by a narrow bridge or lip 74 of the bore 32 extending from the row of ports 70 to the top of the annular auxiliary chamber 72.

At the beginning of the intake stroke of a four stroke cycle, for the purpose of illustration, both the poppet valve 28 and the spool valve 34 are seated in their most upward positions, sealing the precombustion chamber 26 from the cylinder 12, as shown at FIG. 1. The valves 28 and 34 remain seated throughout the exhaust and intake strokes, and during most of the compression stroke as shown by the clear portions of the circle diagrams of FIGS. 4A–4D, representing 720° of rotation of the engine crankshaft. During the period when both valves 28 and 34 are seated, it will be seen by reference to FIG. 1 that the annular groove 60 of the spool valve 34 is in communication with the fuel supply line 52. Fuel under pressure in the fuel supply line 52 fills the annular groove 60.

Figure 2:
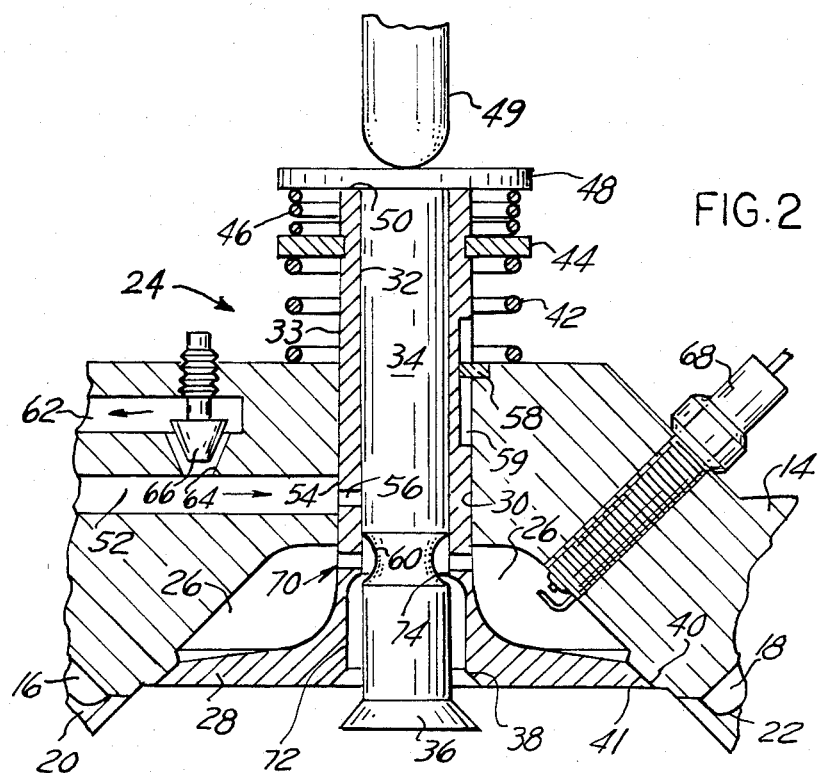
FIGS. 2 and 3 are views similar to FIG. 1 but showing the invention in operation.

At the optimum moment prior to the end of the compression stroke, the spool valve 34 is reciprocated downwardly within the poppet valve 28 until the bottom of the spring retainer 48 contacts the abutment defined by the top 50 of the stem 33 of the poppet valve 28, while the poppet valve 28 remains seated. The period of engine crankshaft rotation during which the spool valve 34 is reciprocated fully downward within the seated poppet valve 28 is represented by the single, cross-hatched portions of the circle diagrams of FIGS. 4B and 4C, corresponding substantially to a crankshaft rotation from 300° to 350°–355°. During this period, the annular groove 60 of spool valve 34 is positioned between the circular row of ports 70 distributed radially through the wall of the stem 33 of the poppet valve 28, and the annular chamber 72 in the bore 32 of the poppet valve 28, which extends from the lip 74 located just below the row of radially spaced ports 70 down to the valve seat 38. With reference to FIG. 2, it is clearly seen that the cylinder 12 is in communication with the precombustion chamber 26, with the result that the previously compressed air from the cylinder 12 rushes past the valve seat 38 of the poppet valve 28 into the annular chamber 72 in the bore 32 of the poppet valve 28 and through the annular groove 60 on the periphery of the spool valve 34. The fuel contained in the groove 60 is vaporized and thoroughly mixes with the air, and the fuel-air mixture is injected through the radially spaced ports 70 into the precombustion chamber 26. The poppet valve 28 continues to be held with its face 40 seated on the seat 41 by the combined forces of the spring 42 and the remaining pressure differential existing between the cylinder 12 and the precombustion chamber 26 until all of the fuel originally contained in the annular groove 60 has been carried into the precombustion chamber 26 by the compressed air from the cylinder 12. Ignition of the combustible mixture within the precombustion chamber 26 may now be initiated by the increasing pressure in the precombustion chamber 26 resulting from the continued flow of compressed air from the cylinder 12, or by firing by the spark plug 68.

Figure 3:
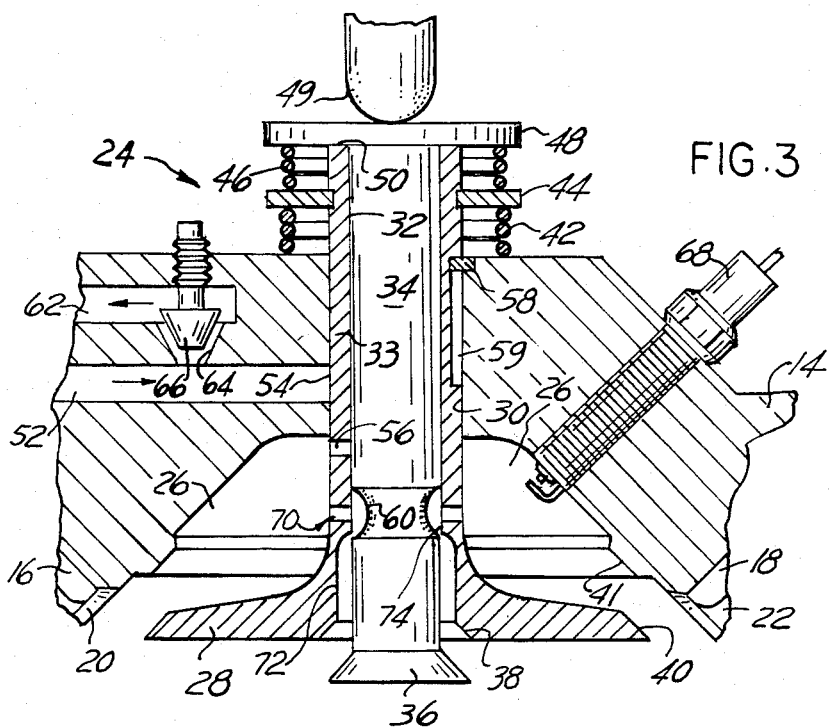

In order to facilitate optimum combustion characteristics, the poppet valve 28 may be opened by the actuating means 49 prior to, during, or immediately after the ignition of the combustible mixture within the precombustion chamber 26. With reference to FIG. 3, it can be seen that the opening of the poppet valve 28 by the continued downward motion of the actuating means 49 acting upon the spring retainer 48 creates a ready path of communication between the cylinder 12 and the precombustion chamber 26, which allows the ignited gases from the precombustion chamber 26 to expand into the cylinder 12 and drive the piston 10 downwardly on the power, or expansion, stroke.

Figure 4A:
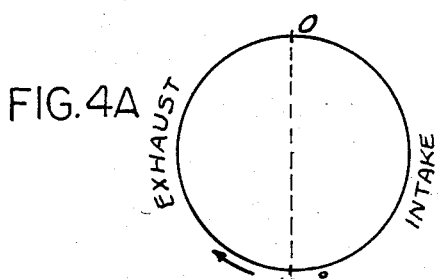
FIGS. 4A through 4D are diagrams representing the approximate timing of the operation of a four-cycle internal combustion engine according to the present invention, with respect to the four operational strokes of that engine.
Figure 4B:
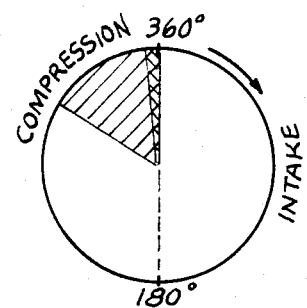
Figure 4C:
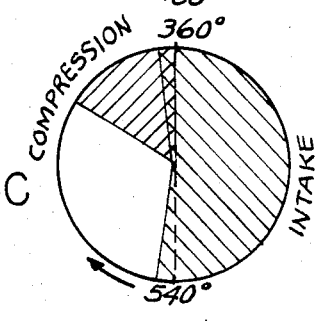
Figure 4D:
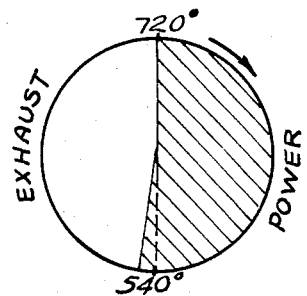

The period during which the poppet valve 28 remains open is represented by the single, oppositely cross-hatched portions of the circle diagrams of FIGS. 4C and 4D, extending approximately from 355° to 550° of crankshaft rotation. The poppet valve 28 closes upon completion of the power stroke. Depending upon the degree of heat and combustion residuals that are desired to remain in the precombustion chamber 26 after completion of the power stroke, the spool valve 34 and the poppet valve 28 may be closed immediately thereafter, prior to the opening of the exhaust valve 22, or they may be held open longer if scavenging is required. The closings of the spool valve 34 and of the poppet valve 28 occur almost simultaneously as represented by the clear portion of the circle diagram of FIG. 4D, and completes the cycle of operation by allowing fuel from the fuel supply line 52 to recharge the annular groove 60 with fuel for the next injection and power cycles.

Having thus described the present invention by, way of examples of structural embodiments for practicing the invention, modification whereof will be apparent to those skilled in the art, what is claimed as new is as follows:

I claim:

1. A fuel injection and combustion structure for an internal combustion engine having a cylinder, a cylinderhead and a piston reciprocable in said cylinder, said structure comprising a precombustion chamber formed in said cylinderhead, valve means for controllably placing said precombustion chamber in communication with said cylinder during a power stroke of said piston, an auxiliary chamber in said first valve means, second valve means for placing said auxiliary chamber in communication with said cylinder and for placing said chamber in communication with said precombustion chamber in the course of a compression stroke of said piston so as to introduce compressed air from said cylinder into said precombustion chamber, and means for injecting a measured amount of fuel in said compressed air passing from said auxiliary chamber to said precombustion chamber, wherein said first valve means comprises a first poppet valve having a longitudinal bore, said second valve means comprises a second poppet valve disposed concentric and reciprocable within said bore in said first poppet valve and said auxiliary chamber is formed by an enlarged end portion of said bore in said first poppet valve.

2. The structure of claim 1 further comprising a sparkplug disposed in said precombustion chamber.

3. The structure of claim 1 further comprising spring biasing means urging said first and second poppet valves to a closed position.

4. The structure of claim 1 further comprising abutment means between said first and second poppet valves, means for displacing said second poppet valve relative to said first poppet valve against said spring biasing means for displacing both said poppet valves relative to said cylinder head after a predetermined displacement of said second poppet valve relative to said first poppet valve causing engagement of said abutment means.

5. A fuel injection and combustion structure for an internal combustion engine having a cylinder, a cylinderhead and a piston reciprocable in said cylinder, said structure comprising a precombustion chamber formed in said cylinderhead, valve means for controllably placing said precombustion chamber in communication with said cylinder during a power stroke of said piston, an auxiliary chamber in said first valve means, second valve means for placing said auxiliary chamber in communication with said precombustion chamber in the course of a compression stroke of said piston so as to introduce compressed air from said cylinder into said precombustion chamber, and means for injecting a measured amount of fuel in said compressed air passing from said auxiliary chamber to said precombustion chamber, wherein said first valve means comprises a first poppet valve having a longitudinal bore, said second valve means comprises a second poppet valve disposed concentric and reciprocable within said bore in said first poppet valve and said auxiliary chamber is formed by an enlarged end portion of said bore, said second poppet valve having a spool portion disposed in said bore in said first poppet valve and an enlarged head portion having a face in sealing engagement with a corresponding seat in said first poppet valve for placing said auxiliary chamber controllably in communication with said cylinder, a peripheral groove formed in said spool, said peripheral groove being in communication with a fuel admitting port when said second poppet valve is closed and in communication with said auxiliary chamber and with at least one port communicating with said precombustion chamber when said second poppet valve is open.

6. The structure of claim 5 further comprising a sparkplug disposed in said precombustion chamber.

7. The structure of claim 2 further comprising spring biasing means urging said first and second poppet valves to a closed position.

8. The structure of claim 2 further comprising abutment means between said first and second poppet valves, means for displacing said second poppet valve relative to said first poppet valve against said spring biasing means for displacing both said poppet valves relative to said cylinder head after a predetermined displacement of said second poppet valve relative to said first poppet valve causing engagement of said abutment means.

* * * * *